United States Patent Office 3,322,543
Patented May 30, 1967

3,322,543
PHOTOGRAPHIC LAYERS FOR THE SILVER
DYESTUFF BLEACHING PROCESS
Walter Anderau, Aesch, Switzerland, assignor to Ciba
Limited, Basel, Switzerland, a Swiss company
No Drawing. Filed Nov. 19, 1963, Ser. No. 324,858
Claims priority, application Switzerland, Dec. 11, 1962,
14,492/62
7 Claims. (Cl. 96—99)

The yellow dyestuffs used for coloring layers in photographic material must possess a wide range of properties when they are to be subjected to the silver dyestuff bleaching process. Such a dyestuff should have an absorption maximum as close to 450 m$\mu$ as possible and should exhibit a steep drop in absorption slightly above 450 m$\mu$, the drop continuing into the region of high transparency in the longer wavelengths. A yellow dyestuff whose absorption maximum is below 420 m$\mu$ is designated greenish yellow by visual assessment, but may be unsuitable for three-layer material because it may not provide sufficient color density for mixed colors. The dyestuff must also possess a good resistance to diffusion. If the dyestuff is sparingly soluble due to the presence of only few groups imparting solubility in water, for example, carboxylic acid or sulfonic acid groups, difficulties arise when coloring the gelatine, it being specially difficult to obtain uniform colorations. Such dyestuffs also tend towards molecular association in the layer, causing opalescence, which has a dulling effect, especially when baths having a high acid or salt content are used in the processing.

Sparingly soluble dyestuffs can also have a precipitating action on gelatine causing flocculation which, although very fine, is very difficult to bleach completely. Pure whites are thus not obtainable. Some dyestuffs and the cleavage products thereof also inhibit the bleaching of the other dyestuffs in the layers. It is also important that the dyestuffs used have a good fastness to light.

The present invention is based on the observation that the yellow dyestuffs used in the photographic material herein described meet these requirements to a large extent. Accordingly, the present invention provides photographic materials for the silver dyestuff bleaching process that contain on a support a layer having at least one dyestuff of the formula

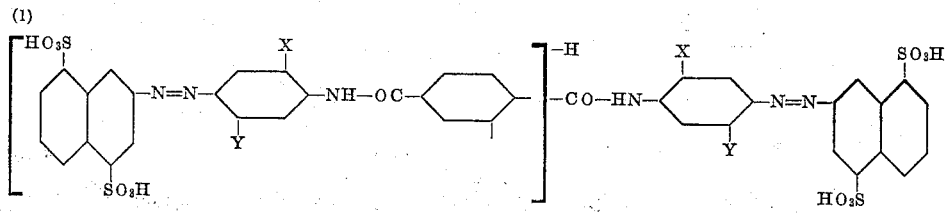

in which X represents a hydrogen atom or a low-molecular alkyl, alkoxy or hydroxyalkoxy group, and Y represents a hydrogen atom or a low-molecular alkyl group.

Dyestuffs of the Formula 1 can be obtained by reacting a dihalide, advantageously the dichloride, of benzene-1:3- or -1:4-dicarboxylic acid with an aminomonoazo dyestuff of the formula

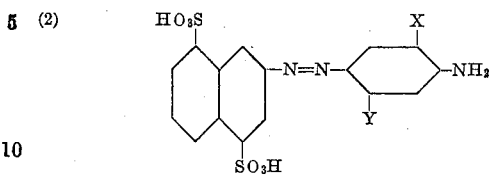

in which X and Y have the meanings given above, in a molecular ratio of 1:2. Amino dyestuffs of the Formula 2 are obtained by coupling diazotized 2-aminonaphthalene-4:8-disulfonic acid with a 1-aminobenzene that may contain a low-molecular alkyl group in 2-position and a low-molecular alkyl, alkoxy or hydroxyalkoxy group in 5-position, but no further substituents. The aforementioned low-molecular radicals contain at most 2 carbon atoms. As examples of coupling components there may be mentioned:

1-amino-2- or -3-methylbenzene,
1-amino-2-methoxybenzene,
1-amino-2-ethoxybenzene,
1-amino-2:5-dimethylbenzene, and
1-amino-2-methoxy-5-methylbenzene.

The dyestuffs of the Formulae 1 and 2 can be prepared by known methods. The coupling to form the aminoazo dyestuffs is carried out in an acid medium; amines that are difficult to couple can be coupled in the form of their ω-methane-sulfonic acids with subsequent elimination of the methane sulfonic acid group. The aminoazo dyestuffs are advantageously reacted with the benzene dicarboxylic acid in the presence of an agent capable of binding acid. Like the dyestuffs, the photographic layers that in accordance with the invention contain at least one dyestuff of the Formula 1, can also be prepared by known methods and used for the production of colored images. In particular, the dyestuffs of the Formula 1 can be present in multilayer material that, on a layer support, contains a selectively red-sensitized layer coloured with a green-blue dyestuff and, above that, a selectively green-sensitized layer colored with a magenta dyestuff and, finally, above that, a blue-sensitive layer colored with a dyestuff of the Formula 1.

The following example illustrated the invention. Unless otherwise stated, the parts and percentages are by weight.

Example 20 milligrams of the dyestuff of the formula

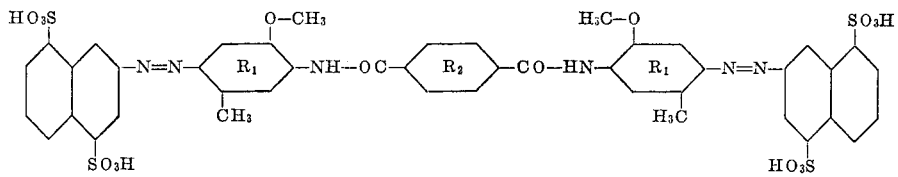

are dissolved in 3.4 cc. of water. This solution is mixed with 3.3 cc. of a 6% gelatine solution and 3.3 cc. of a silver bromide emulsion (with a gelatine content of 6.5% and 16 grams of silver per kilogram), and the mixture poured on to a plate measuring 234 square centimetres. Exposure is made behind a stepped photometric absorption wedge and the silver image developed in a Metol-hydroquinone developer and fixed. The image dyestuff is then bleached out, in accordance with the amount of silver present, in a bath containing, per 1000 parts by volume, 30 to 100 parts by volume of 32% hydrochloric acid, 40 to 120 parts of potassium bromide, 30 to 50 parts of thiourea and 0.001 to 0.01 part of 2-amino-3-hydroxy-phenazine. Excess silver is removed in a bath containing, per 1000 parts by volume, 100 parts of sodium chloride, 100 parts of crystalline copper sulfate and 50 parts by volume of 37% hydrochloric acid. Finally, fixation is carried out in the usual manner. A yellow color wedge is obtained that constitutes the opposite image of the silver image originally used and that is bleached pure white at areas where the silver was originally most dense. Such a yellow image can also form a part of multi-color material.

Similar results are obtained by using, instead of the dyestuff of the Formula 3, symmetrical disazo dyestuffs that also contain two radicals of 2-aminonaphthalene-4:8-disulfonic acid, two of the radicals of the formula —N=N—$R_1$—NH— and one radical of the formula —OC—$R_3$CO—:

| | $R_1$ | $R_2$ |
|---|---|---|
| 1 | -N=N-⟨⟩-NH- (H₃C) | -OC-⟨⟩-CO- |
| 2 | -N=N-⟨CH₃⟩-NH- (H₃C) | -OC-⟨⟩-CO- |
| 3 | -N=N-⟨CH₃⟩-NH- | -OC-⟨⟩-CO- |
| 4 | -N=N-⟨O-CH₂-CH₂-OH⟩-NH- | -OC-⟨⟩-CO- |
| 5 | -N=N-⟨O-CH₃⟩-NH- (H₃C) | -OC-⟨⟩-CO- (CO-) |

The dyestuff of the Formula 3 can be prepared as follows: 60.6 parts of 2-aminonaphthalene-4:8-disulfonic acid, in the form of the sodium salt, are dissolved in 1000 parts of water, the solution is cooled to 0° C. with ice and diazotized in the usual manner with 65 parts of 37% hydrochloric acid and 14 parts of sodium nitrite. 30.5 parts of 2-methoxy-5-methyl-1-aminobenzene are dissolved at 60 to 70° C. in 300 parts of water and 30 parts of 37% hydrochloric acid, the solution is cooled with ice to 5° C. and then added to the solution of the diazo compound. The whole is stirred for 24 hours at a temperature between 8 and 15° C. to complete the coupling and formation of the aminomonoazo dyestuff. The coupling time can be shortened by buffering the mineral acid with sodium acetate. The acid suspension of the monoazo dyestuff is heated to 65° C. and subsequently filtered at 30° C.

The precipitate of the monoazo dyestuff is suspended in 1000 parts of water and dissolved with sodium carbonate, first using sufficient to neutralize the solution and then adding enough to give it a weak alkaline reaction. The solution is heated to 25° C. and 30 parts of crystalline sodium acetate are added. 19 to 21 parts of terephthalic acid dichloride which had been moistened with a small amount of acetone and then ground are then added. Heat is evolved during the reaction and a temperature of 25 to 35° C. is maintained. The pH-value is raised from 9 to 10 in the course of 2 hours by the addition of a small amount of sodium hydroxide solution. After the condensation, the reaction mixture is heated to 65° C. and 12 parts of sodium carbonate are added. After cooling the reaction mixture to 40° C. it is filtered and by-products are washed out of the condensate with ethanol and acetone. The dyestuff is then dried.

Dyestuffs 1 to 5 in the table can likewise be prepared in this manner from the corresponding starting materials, their constitution as indicated in the table.

What is claimed is:

1. Photographic material for the silver dyestuff bleaching process which contains on a support a layer containing silver halide and at least one dyestuff of the formula

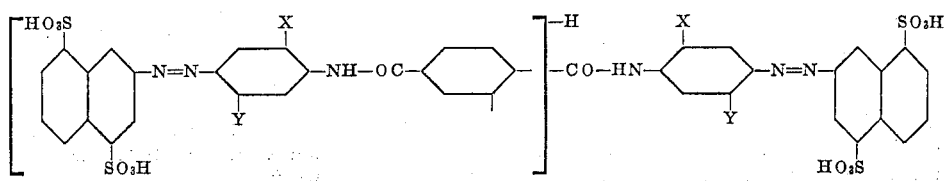

in which X represents a member selected from the group consisting of a hydrogen atom, a lower alkyl group, a lower alkoxy group and a lower hydroxyalkoxy group,

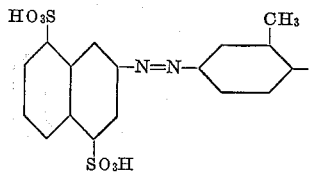

and Y represents a member selected from the group consisting of a hydrogen atom and a lower alkyl group.

2. Photographic material for the silver dyestuff bleaching process which contains on a support a layer containing silver halide and the dyestuff of the formula

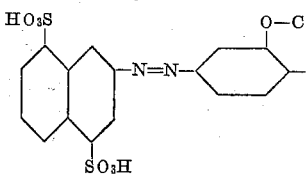

3. Photographic material for the silver dyestuff bleaching process which contains on a support a layer containing silver halide and the dyestuff of the formula

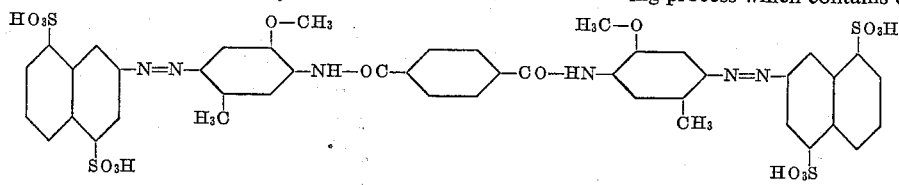

4. Photographic material for the silver dyestuff bleaching process which contains on a support a layer containing silver halide and the dyestuff of the formula

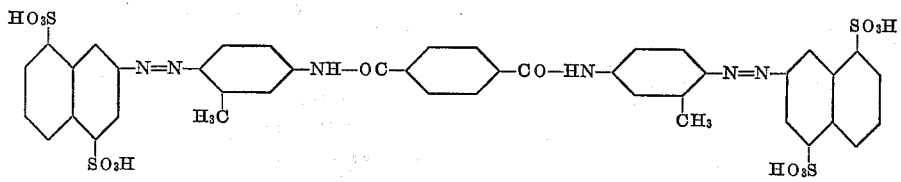

5. Photographic material for the silver dyestuff bleaching process which contains on a support a layer containing silver halide and the dyestuff of the formula

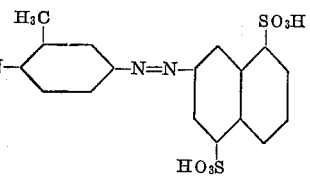

6. Photographic material for the silver dyestuff bleaching process which contains on a support a layer containing silver halide and the dyestuff of the formula

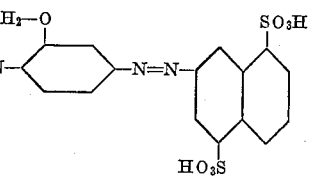

7. Photographic material for the silver dyestuff bleaching process which contains on a support a layer containing silver halide and the dyestuff of the formula

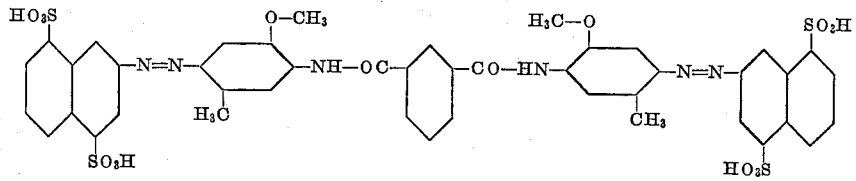

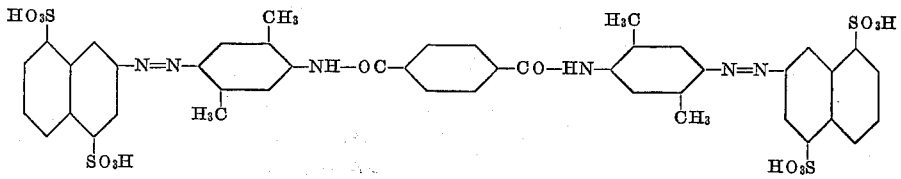

References Cited
UNITED STATES PATENTS

| | | | |
|---|---|---|---|
| 2,899,305 | 8/1959 | Bossard et al. | 96—99 |
| 3,178,291 | 4/1965 | Mory et al. | 96—99 |
| 3,211,554 | 10/1965 | Dreyfuss | 96—99 |

NORMAN G. TORCHIN, *Primary Examiner.*

J. TRAVIS BROWN, *Examiner.*